United States Patent
De Grancey et al.

(10) Patent No.: US 11,788,842 B2
(45) Date of Patent: Oct. 17, 2023

(54) HYBRID AHRS SYSTEM COMPRISING A DEVICE FOR MEASURING THE INTEGRITY OF THE CALCULATED ATTITUDE

(71) Applicant: THALES, Courbevoie (FR)

(72) Inventors: Florence De Grancey, Valence (FR); Jacques Coatantiec, Valence (FR)

(73) Assignee: THALES, Courbevoie (FR)

( * ) Notice: Subject to any disclaimer, the term of this patent is extended or adjusted under 35 U.S.C. 154(b) by 186 days.

(21) Appl. No.: 17/297,435

(22) PCT Filed: Nov. 27, 2019

(86) PCT No.: PCT/EP2019/082654
§ 371 (c)(1),
(2) Date: May 26, 2021

(87) PCT Pub. No.: WO2020/114842
PCT Pub. Date: Jun. 11, 2020

(65) Prior Publication Data
US 2022/0026216 A1    Jan. 27, 2022

(30) Foreign Application Priority Data
Dec. 4, 2018   (FR) ...................................... 1872262

(51) Int. Cl.
*G01C 21/16* (2006.01)
*G01S 19/47* (2010.01)

(52) U.S. Cl.
CPC ............ *G01C 21/165* (2013.01); *G01S 19/47* (2013.01)

(58) Field of Classification Search
CPC ........ G01C 21/165; G01C 21/16; G01S 19/47
See application file for complete search history.

(56) References Cited

U.S. PATENT DOCUMENTS

| | | | |
|---|---|---|---|
| 5,512,903 A | 4/1996 | Schmidtke | |
| 9,341,718 B2 | 5/2016 | Vanderwerf | |
| 11,142,309 B2* | 10/2021 | Deslypper | ............... B64C 17/06 |
| 2011/0181463 A1* | 7/2011 | Chopard | ................. G01S 19/24 |
| | | | 342/357.68 |

(Continued)

FOREIGN PATENT DOCUMENTS

EP    3 018 447 A1    5/2016

*Primary Examiner* — Manuel L Barbee
(74) *Attorney, Agent, or Firm* — BakerHostetler

(57) ABSTRACT

A hybridized system for measuring the attitude of a wearer, the system includes a satellite positioning system; a measurement unit comprising at least one gyrometer; electronics for calculating the attitude information of the wearer from the information originating from the satellite positioning system and the measurement unit. The hybrid system comprises calculation electronics comprising a means for calculating an angular radius of protection, that is to say an angular radius such that the risk that the error between the calculated attitude and the true attitude of the wearer is not included within this radius is less than a given probability, the radius being equal to the sum of two contributions, the first contribution being equal to positioning errors linked to the measurement unit, the second contribution being equal to positioning errors linked to the satellite positioning system.

7 Claims, 2 Drawing Sheets

(56) References Cited

U.S. PATENT DOCUMENTS

2014/0074397 A1* 3/2014 Vanderwerf ............ G01S 19/47
            701/472
2016/0131485 A1* 5/2016 Coatantiec .............. G01S 19/49
            701/512

* cited by examiner

HYBRID AHRS SYSTEM COMPRISING A DEVICE FOR MEASURING THE INTEGRITY OF THE CALCULATED ATTITUDE

CROSS-REFERENCE TO RELATED APPLICATIONS

This application is a National Stage of International patent application PCT/EP2019/082654, filed on Nov. 27, 2019, which claims priority to foreign French patent application No. FR 1872262, filed on Dec. 4, 2018, the disclosures of which are incorporated by reference in their entirety.

FIELD OF THE INVENTION

The field of the invention is primarily that of aeronautical navigation and, in particular, of the hybridized measurement systems implementing both inertial measurement units and satellite geolocation means.

BACKGROUND

The systems, called "AHRS", the acronym for Attitude and Heading Reference System, are equipment incorporating inertial measurements of accelerations and of angular rotations in order to determine the attitudes of a carrier. Attitude is understood to mean the orientation of the carrier in space. This carrier is generally an aircraft. In this case, the attitude is typically defined by the roll, pitch and yaw values.

Because of the defects in the measurements from the various sensors, these attitudes are errored and the quantity of error is incremental. In some AHRS such as that represented in FIG. 1, the integrated attitudes Ai obtained after integration of the angular velocities $V_A$ are corrected by comparing them to reference attitudes $A_R$ which are generally attitudes called accelerometric attitudes obtained by the projection of the Earth's gravity onto horizontal axes linked to the carrier. The deviation between the AHRS attitudes and the reference attitudes is looped back with a certain gain G. In this figure and in FIG. 3, the integrators are represented by the integration symbol given by an elongated S.

In order to improve the accuracy of the system, the inertial measurements can be merged with measurements originating from a satellite navigation system, a system called GNSS, the acronym for Global Navigation Satellite System.

In the aeronautical context, the data concerning the attitude of the craft are demanded with a real-time quantification of their integrity, that is to say of the probability of the measurement error being above a determined threshold taking into account the various possible failure causes. For example, an integrity of less than $10^{-7}$ per hour is often demanded for aircraft attitude measurements.

The attitudes obtained from the AHRS are supplied without quantification of their integrity. It is however possible to estimate this integrity subject to the use of an algorithm close to that of the high performance inertial units. This method demands:

high complexity and a high computation load, the integrity of the inertial units being estimated through the parallel use of multiple Kalman filters. The reference European application EP 3 018 447 entitled "Method for determining a radius of protection associated with a navigation parameter of a hybrid inertial navigation system and associated system" proposes a first solution of this type. The patent U.S. Pat. No. 9,341,718 entitled "Method and system for providing integrity for hybrid attitude and true heading" also proposes a solution of this type.

performance constraints on the inertial sensors of the AHRS units in order to have an accuracy allowing the use of Kalman filters. As an example, the drift of the gyrometers must be less than ten degrees per hour.

The hybrid system according to the invention does not present the above drawbacks. Indeed, the attitude estimation is performed conventionally. AHRS positions are estimated by triple integration of the AHRS inertial measurements. These AHRS hybrid positions are compared with the GNSS positions to deduce corrections therefrom. These corrections are applied to the hybrid data.

SUMMARY OF THE INVENTION

The invention relates to the production of a measurement of the integrity of these attitudes. In the system according to the invention, the integrity is estimated using the knowledge of the transfer functions of the hybridation filter, of the value of the protection radius associated with the position given by the receiver of the satellite positioning system and by the computation of a majorant constant derived from the knowledge of the hybridized AHRS system. The protection radius is computed for an integrity of $10^{-7}$/h.

More specifically, the subject of the invention is a system for measuring the attitude of a carrier, said system being hybridized and comprising at least:

a satellite positioning system;
  a measurement unit comprising three gyrometers and three accelerometers;
  electronics for computing attitude information of the carrier from information obtained from the satellite positioning system and from the measurement unit, characterized in that the computation electronics comprise a means for computing an angular protection radius, that is to say an angular radius such that the risk of the error between the computed attitude and the true attitude of the carrier not lying within this radius is less than a given probability, said radius being equal to the sum of two contributions, the first contribution being equal to the attitude errors linked to the measurement unit, the second contribution being equal to the errors induced on the attitude estimations by the position errors due to the satellite positioning system, taking into account an assumed failure of the satellite positioning system.

Advantageously, the first contribution is equal to the maximum positioning error obtained from Monte-Carlo simulations taking into account all of the possible errors of the measurement unit.

Advantageously, the second contribution is equal to the product:

of the gain of a transfer function of the electronics for computing the attitude of the carrier, said transfer function being determined for a frequency of oscillation of the position given by the satellite positioning system; by the value of the protection radius of the satellite positioning system, said value being known by the term HIL, the acronym for Horizontal Integrity Limit.

Advantageously, the attitude computation electronics comprise three integrators in series and a constant-gain correcting filter, the input data of the first integrator being the angular velocity information of the carrier and the input data of the second integrator being the accelerations of the carrier and the result of the first integrator, the input data of the third integrator being the result of the second integrator initialized by the position information given by the satellite positioning system, the output data of the first integrator being the attitude information of the carrier, called hybridized attitude, the output data of the second integrator being the velocity information of the carrier, called hybridized velocity, and the output data of the third integrator being the position information of the carrier, called hybridized position.

Advantageously, the angular protection radius is less than 1 degree.

Advantageously, the integrity associated with the angular protection radius lies between $10^{-5}$/hour of use and $10^{-9}$/hour of use.

Advantageously, the carrier is an aircraft.

BRIEF DESCRIPTION OF THE DRAWINGS

The invention will be better understood and other advantages will become apparent on reading the following description given in a nonlimiting manner and from the attached figures in which.

DETAILED DESCRIPTION

Figure 1:
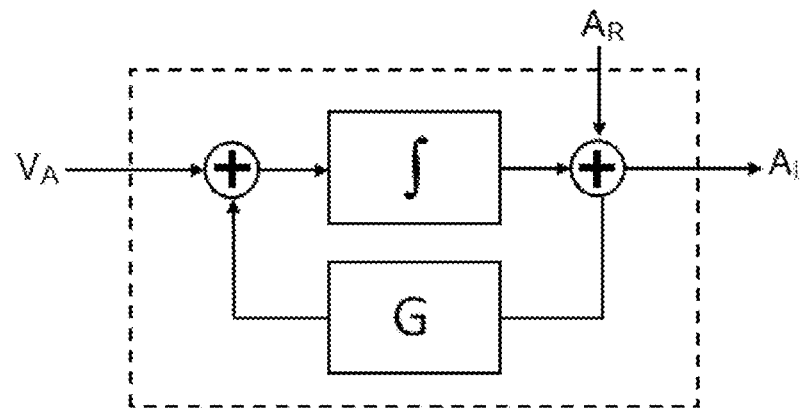
FIG. 1 previously discussed, represents an AHRS unit according to the prior art.
Figure 2:
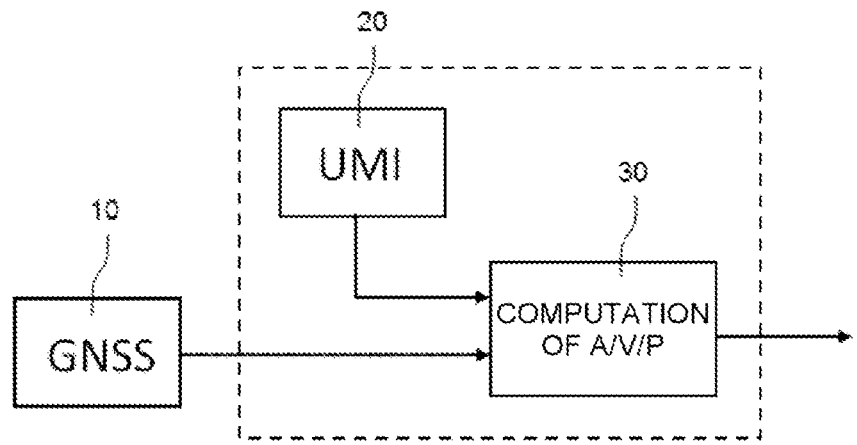
FIG. 2 represents a system for measuring the attitude of a carrier according to the invention.

The attitude measurement system according to the invention is, as has been stated, a hybrid system. It is represented in FIG. 2. It is incorporated in a carrier, not represented in this figure. It comprises at least:
- a GNSS satellite positioning system 10;
- an inertial measurement unit "UMI" 20 comprising gyrometers and accelerometers;
- electronics 30 for computing hybridized attitude A, velocity V and positioning P information of the carrier from the information obtained from the satellite positioning system 10 and from the measurement unit 20.

The measurement system operates in real time.

The satellite positioning systems 10 are known to a person skilled in the art. They supply real-time carrier position information. In the same way, the angular velocity and acceleration measurement units 20 are known to a person skilled in the art.

The measurement system uses the increments measured by the inertial measurement unit UMI 20, a reference heading and the conventional outputs of the GNSS receiver 10. The real-time computation platform 30, incorporated in the device, performs the calculations of the hybrid attitude A, velocity V and position P data. The attitude estimation is performed conventionally. The AHRS positions are estimated by triple-integration of the AHRS inertial measurements. These hybrid AHRS positions are compared with the GNSS positions to deduce corrections therefrom. These corrections are applied to the hybrid data by means of correcting filters 34.

Figure 3:
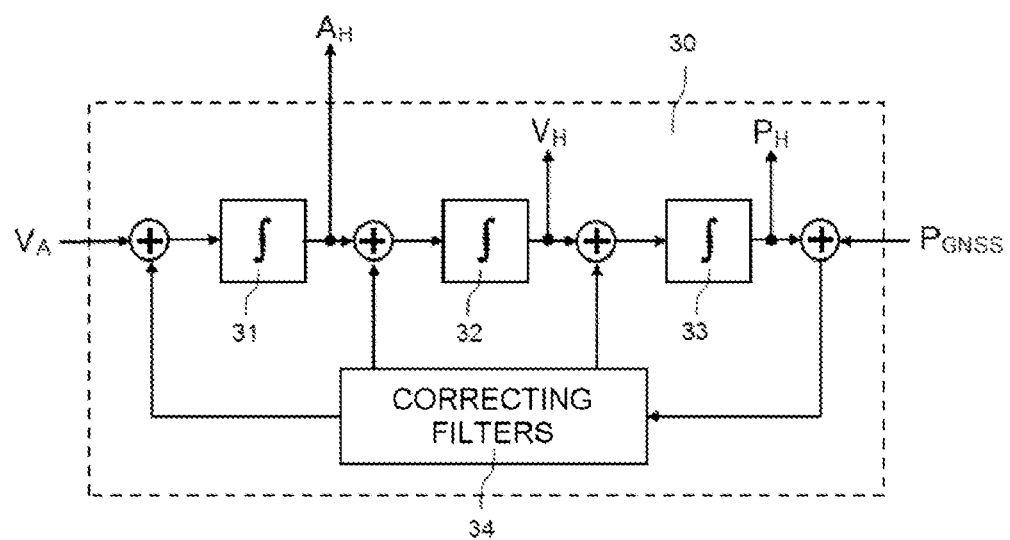
FIG. 3 represents attitude information computation electronics according to the invention.

More specifically, the computation of the hybrid AHRS attitudes is performed in the computation platform internal to the equipment 30 which is represented in FIG. 3. It comprises a chain of three integrators 31, 32 and 33. The integrator 31 is an integrator of the angular velocities $V_A$ obtained from the inertial measurement unit 20. It supplies hybrid attitudes AH. The integrator 32 is an attitude integrator. It supplies hybrid velocities VH. The integrator 33 is a position integrator. It supplies hybrid positions $P_H$. The operation of these integrators is like that of the inertial units. The computation platform also includes a gravity acceleration computation function which is added to the integrated accelerometric increments, and a Coriolis acceleration correction function, to take account of the fact that the integration of the accelerometers is done in a non-Galilean reference frame. These functions are not represented in FIG. 3.

The platform can be mechanized in terms of geographic axes or in terms of axes linked to the platform. The geographic axes are, for example, referenced north, east, down, or "NED".

Each hybrid position obtained by integration of the data from the UMI 20 is compared to the same position obtained by the GNSS positioning system 10 to deduce a deviation therefrom. The deviations are obtained in three dimensions according to three axes, for example in the form of latitude, longitude and altitude deviations in the case of an NED mechanization.

From these deviations, corrections are generated by constant-gain correcting filters 34, incorporated in the computation platform. The gains are adjusted according to the response time and the desired robustness. High gains induce a short response time but a greater sensitivity to the GNSS position errors. Small gains lead to great robustness to the GNSS position errors.

Each correcting filter is dedicated to a path corresponding to a particular axis. For example, the first path corresponds to a latitude deviation, the second path to a longitude deviation and a third path to an altitude deviation. For the latitude or longitude deviations, the correcting filter produces position, velocity, attitude and precession corrections. For the altitude deviations, the correcting filter produces only altitude and vertical velocity deviations.

The gains Ki of the correcting filters are computed by establishing the analytical transfer function of the system. They are defined as a function of the time constant t of the system. For example, in the case of the latitude correcting filter, the gains are as follows:

$$K3 = \frac{Rt}{(-g) \cdot \tau^4}$$

$$K1 = \frac{+(4\xi^2 + 2) \cdot Rt}{\tau^2}.$$

$$K2 = \frac{4\xi Rt}{(-g) \cdot \tau^3}$$

$$K0 = \frac{4\xi \cdot Rt}{\tau}$$

Rt being the radius of the Earth, g being the acceleration of gravity and; being the damping coefficient. This coefficient is close to 1.

The value of $\tau$ dimensions the response of the system. A small time constant $\tau$ leads to significant corrections and a better tracking of the trend of the position deviations. A high time constant $\tau$ leads to lower corrections and a greater smoothing of the trending of the position deviation.

One of the difficulties in this type of system is estimating the error of the output data. It is however important, in a certain number of applications, to provide attitude data with a known integrity corresponding to the probability of the measurement error being above a determined threshold, taking into account the possible failure causes.

The object of the invention is to limit these measurement errors in order to guarantee a given integrity. In the system according to the invention, the integrity of the attitudes is assured through the production of a protection radius, that is to say a threshold such that the error between the true attitude and the estimated attitude is above this threshold only below a given probability. In an aeronautical context, depending on the applications, this probability varies between $10^{-5}$/hour of use and $10^9$/hour of use.

The threshold can take account of all of the contributions of errors on the hybrid AHRS attitudes. In this context, the following are identified:
- the errors due to the inertial sensors;
- the errors introduced by the server controls retained;
- the errors due to the GNSS inputs used to correct the hybrid attitudes. It is essential to take account of the "routine" errors linked to the accuracy of the GNSS and the errors of "GNSS system failure" type.

The HIL protection radius of the hybrid AHRS attitudes is modeled in the form $$HIL = H0_{DYN} + H1$$

with:

$H0_{DYN}$: the contribution of the errors linked to the defects of the sensors and to the algorithm.

$H1$: contribution linked to the GNSS errors, taking into account an assumed GNSS failure.

Because of the complexity of the system, of the variety of the behaviors of the sensor errors, or of the cases of use of the device, an analytical computation of $H0_{DYN}$ is not feasible. The estimation is therefore done on the basis of Monte-Carlo simulations on a software model of the system. To be comprehensive with respect to all of the combinations of errors due to the sensors and the various cases of use, $H0_{DYN}$ is chosen to be equal to the maximum attitude error value corresponding to the worst error case identified in the simulations. As an example, the number of simulations necessary to the estimation of this error can be $10^{-6}$.

The computation of H1 can be done analytically. The hybrid attitudes, velocities and positions are computed by successive integration of the inertial increments, then corrected using the constant-gain correcting filter. Consequently, all of the system is perfectly known and modelable. Through this knowledge, it is possible to compute the transfer function of the system H(p).

$$S(p) = H(p) \cdot E(p)$$

The transfer function H(p) allows the output S(p) to be described as a function of a determined input E(p). The modulus of H(p) gives, in particular, the multiplying coefficient between the amplitude of a disturbance at the input and the resultant at the output. The disturbances at the input can be on the accelerometric or gyrometric inertial increments and/or errors on the GNSS position used as reference.

In the case of GNSS hybridized AHRS, the "hybrid attitudes error" output can be considered as a function of the "error on the GNSS position" input. By using the modulus of this transfer function, for a position error ErrGNSS oscillating at a frequency f, the impact on the attitude error ErrATT can be computed at the same frequency. If the transfer function is denoted $HE_{rrGNSS \to ERrAtt}$, then the relationship below applies:

$$ErrATT(f) = H_{ErrGNSS \to ErrAtt}(f) \cdot ErrGNSS(f)$$

The error on the GNSS position can cover different kinds. It can be a "normal and rare" error corresponding to the conventional GNSS errors, an oscillating error or an error linked to a failure of the GNSS system. In all the cases, the GNSS position is supplied with a measurement of its integrity or Horizontal Integrity Limit HIL. The GNSS system guarantees that, subject to a given failure of probability, the error on the GNSS position is below this radius. Above this radius, the GNSS system is declared as failed.

The transfer function $HE_{rrGNSS \to ErrAtt}$ (f) is then used to compute the response of the hybridized AHRS system with, as input, the value of $HIL_{GNSS}$. The output is then the radius of integrity of the hybrid attitudes $RP_{ATT}$ (f) assuming that the GNSS errors oscillate at a given frequency.

$$RP_{ATT}(f) = H_{ErrGNSS \to ErrAtt}(f) \cdot HIL_{GNSS}(f)$$

To limit this error, the frequency inducing the strongest response, that is to say the maximum of the transfer function, is chosen. The following can then be written $$H1 = \max(|H_{ErrGNSS \to ErrAtt}(f)|) HIL_{GNSS}$$

The protection radius of the AHRS hybrid attitudes is therefore the sum of these two contributions.

$$HIL = H0_{DYN} + \max(|H_{ErrGNSS \to ErrAtt}(f)|) HIL_{GNSS}$$

All of the computations necessary to the determination of the two contributions of the protection radius HIL do not pose particular problems for a person skilled in the art and require only adaptations of the software of an AHRS unit.

The system for measuring the attitude of a carrier according to the invention offers many advantages detailed hereinbelow.

The system can be adapted to any kind of inertial sensor of AHRS class. In particular, the computation of the protection radius can be done within a wide spectrum of drifts of the inertial units, lying between 100°/h and 0.1°/h. The performance loss of the inertial sensors has little influence on the performance of the method, the estimated HIL being dependent essentially on the GNSS HIL.

The system according to the invention allows for the computation of integrated AHRS attitudes with a protection radius of the order of the degree for an integrity of $10^{-7}$/h from existing standard components which are an AHRS unit, a GNSS receiver and an electronic computer.

The method for computing the AHRS attitudes is simple. It is based on a single constant-gain filter.

The method for computing integrity is also simple and inexpensive in terms of real-time computation load. The integrity computation in the inertial systems is generally processed using complex algorithms that use multiple Kalman filters in parallel. In the system according to the invention, only the knowledge of the transfer function of the constant-gain filter is used. It is sufficient to multiply the GNSS HIL by a constant, computed analytically in the design of the correcting filter and add a constant. This solution can therefore be embedded in systems that are not complex comprising limited computation capabilities.

The protection radius is majorant. Indeed, the integrity assumptions made are majorant with respect to the real conditions as long as the most favorable case is retained. This ensures a high degree of relevance in the estimated integrity.

Finally, the system according to the invention is particularly well suited to aeronautical use. In this case, the architecture for implementation comprises the following elements:
- an aeronautical inertial unit of AHRS type;
- an aeronautical GNSS receiver;
- a computer, which can be incorporated in the AHRS equipment.

The invention claimed is:

1. A system for measuring the attitude of a carrier, said system being hybridized and comprising at least:
   a satellite positioning system;
   a measurement unit comprising three gyrometers and three accelerometers;
   electronics for computing attitude information of the carrier from information obtained from the satellite positioning system and from the measurement unit,
   wherein the electronics for computing comprise a means for computing an angular protection radius, that is to say an angular radius such that the risk of the error between the calculated attitude and the true attitude of the carrier not lying within this radius is less than a given probability, said radius being equal to the sum of two contributions, the first contribution being equal to the attitude errors linked to the measurement unit, the second contribution being equal to the errors induced on the attitude estimations by the position errors due to the satellite positioning system, taking into account an assumed failure of the satellite positioning system, said satellite positioning system guaranteeing that, subject to a given probability of failure, the error on the position is below an integrity radius, above this integrity radius, the satellite positioning system being declared as failed.

2. The system for measuring the attitude of a carrier as claimed in claim 1, wherein the first contribution is equal to the maximum positioning error obtained from Monte-Carlo simulations taking into account all of the possible errors of the measurement unit.

3. The system for measuring the attitude of a carrier as claimed in claim 1, wherein the second contribution is equal to the product
   of the maximum gain of a transfer function of the electronics for computing the attitude of the carrier, said transfer function being determined for a frequency of oscillation of the position given by the satellite positioning system
   by the value of the protection radius of the satellite positioning system, said value being known by the term HIL, the acronym for Horizontal Integrity Limit.

4. The system for measuring the attitude of a carrier as claimed in claim 1, wherein the attitude computation electronics comprise three integrators in series and a constant-gain correcting filter, the input data of the first integrator being the angular velocity information of the carrier and the input data of the second integrator being the accelerations of the carrier and the result of the first integrator, the input data of the third integrator being the result of the second integrator initialized by the position information given by the satellite positioning system, the output data of the first integrator being the attitude information of the carrier, called hybridized attitude, the output data of the second integrator being the velocity information of the carrier, called hybridized speed, and the output data of the third integrator being the position information of the carrier, called hybridized position.

5. The system for measuring the attitude of a carrier as claimed in claim 1, wherein the angular protection radius is less than 1 degree.

6. The system for measuring the attitude of a carrier as claimed in claim 1, wherein the probability lies between $10^{-5}$/hour of use and $10^{-9}$/hour of use.

7. The system for measuring the attitude of a carrier as claimed in claim 1, wherein the carrier is an aircraft.

* * * * *